2,717,207

ANIMAL FEEDS

Artemy A. Horvath, Santa Fe, N. Mex.

No Drawing. Application February 2, 1954,
Serial No. 407,803

7 Claims. (Cl. 99—2)

This invention is concerned with feeds for animals and particularly with improvements in feeds containing certain alfalfa residues. These alfalfa residues are relatively free of some of their original components when compared with normal or complete alfalfa. A new use of such residues, by this invention, arises from improved properties they impart to feeds for animals.

Alfalfa is well received in animal nutrition because of the variety and the extent of its valuable components. Its protein content is high in quantity as well as high and balanced in its amino acid components. Alfalfa contains the amino acids, arginine, histidine, isoleucine, leucine, lysine, methonine, cystine, phenylalanine, tyrosine, threonine, tryptophane and valine. The high content of protein in alfalfa signifies a large proportion of nitrogen compounds to which other components may be bound.

In alfalfa the plant components available for animal nourishment are biased in the conditions that determine the way that these components break down during digestion. This bias in part is determined by a high proportion of calcium in the mineral content of alfalfa; that is an alkaline ash characterized by dominance of calcium. The contrary is true of many feeds, particularly many grains or other seeds. In this respect this invention is distinguished in important features of the setting or environment in which digestion of the animal feed occurs.

In alfalfa are contained also an extensive balance of vitamins, including A, B, (thiamine), riboflavine, niacin, pantothenic acid, choline, betaine, biotin, folic acid, vitamin D, vitamin E and vitamin K.

It should be recognized that the peculiar make-up of alfalfa bears a corresponding causal relation to the biochemical changes that it engenders during digestion. The particular components break down and form new products. But these new products are not always those desired for animal nourishment. The problem is to control or bias the digestion of alfalfa to obtain the most nourishment; or at least to avoid side effects that may harm the animal.

As an instance, alfalfa is reputedly harmful on some occasions because of its tendency to form gases in the digestive tract of some animals, under such circumstances that the animal cannot release the gas but on the contrary distends and may even die from the gas pressure. Such is the result sometimes known as bloating in ruminant animals, or in horses oftentimes diagnosed simply as colic. Somewhat allied is the observation that at a certain stage of growth alfalfa is considered by some authorities to be poisonous to animals, as also the observations that when alfalfa is frost-bitten it sometimes is poisonous to animals or when fresh with dew or with rain alfalfa is harmful to animals. For some animals, such as chickens, alfalfa is considered by some observers to repress growth to some extent. It even is supposed by some that alfalfa contains factors that inhibit growth of fowls. Hence in meal for fowls, care frequently is taken that not more than some certain percent of alfalfa be included, such for example as not over ten percent.

Various theories are extent to account for these many and diverse harmful side effects of alfalfa in animal nutrition. However, this invention is not dependent on one or another of such theories. On the contrary, it is sufficient to recognize that in some way or ways alfalfa may break down during digestion to yield other than the most desirable nutritional products. It is significant also that digestive conditions vary from animal to animal and from circumstance to circumstance, oftentimes fortuitously.

This invention is to alleviate such undesirable side-effects in animal digestion of alfalfa. Consequently this invention improves animal feeds by using certain residues of alfalfa. This invention is based on the discovery that these residues are free from components that bias animal digestion to such undesirable effects as have been mentioned. These residues are those obtained from extraction of alfalfa with aliphatic alcohols lower than $C_4$ alcohols. After extraction it is preferable to segregate the alfalfa residues from the alcohol solution. Then the residue is ready for use as animal feed. It may be pelleted by itself or it may be intermixed with other components of animal feed.

While this invention is susceptible of many variants and forms in practice, certain details of practice in the extraction are preferred because of their superior efficacy. Thus it is particularly desirable to extract alfalfa with isopropyl alcohol. Though the isopropyl alcohol gives some benefits of this invention when its concentration is above 95 percent, almost to anhydrous condition; yet best results are obtained in the range of about 75 percent to 95 percent alcohol with the balance water. The preferred specific concentration is about 90 percent alcohol.

Some benefits of this invention are obtained with other alcohols below $C_4$ as extractant for alfalfa, for example, methyl alcohol, ethyl alcohol, or propyl alcohol. With these also the alcohol content may range from about 80 percent to 95 percent, preferably about 90 percent; though the efficacy of these alcohols is notably less than the preferred extractant isopropyl alcohol.

Other conditions for the extraction will now become apparent to those skilled in the art. Thus, the alfalfa may be fresh or in various degrees of dehydration; it may range in particle size from natural condition of the plant to comminuted particles. The extraction itself tends to break the alfalfa into smaller particles, or to facilitate such breakage after the residue is segregated from the alcohol. This is particularly true of the isopropyl alcohol extraction, which evidently is superior to attack the alfalfa cellular constituents.

Other conditions likewise may now be selected for optimum results under various operating conditions by those skilled in the art who follow this invention. Thus, for example, the temperature of the extractant may vary from atmospheric temperature up to boiling of the particular extractant. The extraction and segregation of residue may be batchwise, though advantages obtain from continuous extraction with subsequent removal of the solid residue followed by evaporation and recovery of the alcohol and its subsequent recycling as solvent. However, from the alcohol extract, particularly the isopropyl alcohol extract, may be recovered various values, for example, carotene. The segregated alfalfa residue, now substantially free of content soluble in the alcohol as compared with normal or complete alfalfa, may now be used as feed for animals.

The particular details of extraction are deemed sufficiently illustrated to inform those skilled in the art, especially having in mind that it is the qualitative fact that is of primary importance; namely, that the alcohol, especially isopropyl alcohol, dissolves or otherwise removes components from alfalfa that would guide animal digestion of the alfalfa into deleterious side effects. The alfalfa residue of this extraction, however, avoids these digestive disturbances. Applicant does not depend on any particular theory of explanation of this result, though it may well be that this extraction removes components that would favor bacterial or enzyme action in the direction of the bloating or other deleterious digestive effects, or at least possibly favor such effects before desired digestion can predominate. It may be that such removal includes sapogenins, but this invention is not confined to such action.

This invention has been explained and its principles set forth in accordance with the Patent Statutes so that those skilled in the art may now follow its practice, and may vary its practice within the scope of the appended claims.

What is claimed is:

1. The process comprising incorporating in animal feed alfalfa residue having substantially no content soluble in aliphatic alcohol lower than $C_4$.

2. The process comprising incorporating in animal feed alfalfa residue having substantially no content soluble in isopropyl alcohol.

3. The process comprising incorporating in animal feed isopropyl-extraction residue of alfalfa.

4. In the process of preparing alfalfa for animal feed the step comprising extracting alfalfa with isopropyl alcohol of the order of ninety percent concentration, and segregating the residue from the extract, the segregation being a step for incorporating the residue in animal feed.

5. In the process of preparing alfalfa for animal feed the steps comprising extracting alfalfa with isopropyl alcohol and conditioning the residue for animal feed, said conditioning comprising removing the isopropyl alcohol.

6. The process of preparing animal feed comprising extracting alfalfa with isopropyl alcohol and incorporating the residue with additional nutrients for animal feed.

7. A new animal feed comprising animal feed nutrients and in addition alfalfa residue having substantially no content soluble in isopropyl alcohol.

No references cited.